(12) United States Patent
Nakayama

(10) Patent No.: US 10,244,134 B2
(45) Date of Patent: Mar. 26, 2019

(54) IMAGE FORMING APPARATUS AND METHOD FOR PREVENTING PRINTING ON UNDECOLORED PAPER

(71) Applicants: KABUSHIKI KAISHA TOSHIBA, Tokyo (JP); TOSHIBA TEC KABUSHIKI KAISHA, Tokyo (JP)

(72) Inventor: Kazuma Nakayama, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/686,929

(22) Filed: Aug. 25, 2017

(65) Prior Publication Data

US 2018/0295250 A1    Oct. 11, 2018

(30) Foreign Application Priority Data

Apr. 11, 2017   (JP) .................. 2017-078199

(51) Int. Cl.
| | |
|---|---|
| *G06F 3/12* | (2006.01) |
| *H04N 1/00* | (2006.01) |
| *G06K 15/00* | (2006.01) |
| *G06K 15/14* | (2006.01) |
| *G06K 15/16* | (2006.01) |

(52) U.S. Cl.
CPC ....... *H04N 1/00875* (2013.01); *G06K 15/005* (2013.01); *G06K 15/14* (2013.01); *G06K 15/16* (2013.01); *G06K 15/4065* (2013.01); *H04N 1/0048* (2013.01); *H04N 2201/0094* (2013.01)

(58) Field of Classification Search
CPC ............ H04N 1/00875; H04N 1/0041; H04N 1/0048; H04N 1/60; H04N 1/4433; H04N 2201/0094; G06K 15/005; G06K 15/14; G06K 15/16; G06K 15/4065; B65H 29/60; G06F 3/1254; G06F 3/1219; G06F 3/1276; G06F 3/128; B41J 11/60
USPC .................................................. 358/1.1–1.18
See application file for complete search history.

(56) References Cited

U.S. PATENT DOCUMENTS

| | | | | |
|---|---|---|---|---|
| 8,608,166 B2 * | 12/2013 | Iguchi | .................... | B65H 29/60 271/176 |
| 8,913,287 B2 * | 12/2014 | Iguchi | ........................ | B41J 2/32 358/1.9 |
| 2011/0222130 A1 * | 9/2011 | Iguchi | ................ | G03G 15/5062 358/452 |
| 2011/0235075 A1 * | 9/2011 | Iguchi | ................ | H04N 1/00567 358/1.12 |

FOREIGN PATENT DOCUMENTS

JP       2010-133998 A       6/2010

* cited by examiner

*Primary Examiner* — Gabriel I Garcia
(74) *Attorney, Agent, or Firm* — Foley & Lardner LLP

(57) ABSTRACT

An image forming apparatus includes a paper feed section and a processing section. The paper feed section stores paper. The processing section executes a decoloring processing for decolorizing an undecolored paper stored in the paper feed section, and issues a warning indicating that the paper stored in the paper feed section is taken out when the decoloring processing is stopped, or does not issue the warning when the decoloring processing is completed.

12 Claims, 5 Drawing Sheets

IMAGE FORMING APPARATUS AND METHOD FOR PREVENTING PRINTING ON UNDECOLORED PAPER

CROSS-REFERENCE TO RELATED APPLICATION

This application is based upon and claims the benefit of priority from Japanese Patent Application No. 2017-078199, filed Apr. 11, 2017, the entire contents of which are incorporated herein by reference.

FIELD

Embodiments described herein relate generally to an image forming apparatus and a method for preventing printing on an undecolored paper.

BACKGROUND

There is an image forming apparatus having a function of forming an image on a paper by a decoloring toner or a normal toner and a function of deodorizing an image by the decoloring toner formed on the paper. Such an image forming apparatus realizes a function of forming an image on a paper fed from a cassette and a function of heating the paper fed from the cassette to deodorize the paper by switching operation modes.

If a decoloring processing is stopped during execution, there is a case where an undecolored paper remains in the cassette. If an image forming processing is executed while the undecolored paper remains in the cassette, there is a problem that the image forming apparatus can print an image on the undecolored paper.

DETAILED DESCRIPTION

In accordance with an embodiment, an image forming apparatus comprises a paper feed section and a processing section. The paper feed section stores a paper. The processing section executes a decoloring processing for deodorizing an undecolored paper stored in the paper feed section, and issues a warning indicating that the paper stored in the paper feed section is taken out if the decoloring processing is stopped, or does not issue the warning if the decoloring processing is completed.

Hereinafter, an embodiment is described with reference to the accompanying drawings.

A multi-function peripheral (MFP) according to an embodiment forms an image on a paper in a cassette or a manual feed cassette. The MFP executes a decoloring processing for decoloring the image to a sheet such as a recording paper on which an image is formed by a decolorable color material such as a decolorable toner or a decolorable ink. The decolorable color material includes a color developing compound, a developing agent and a decoloring agent. Leuco dyes are exemplified as a color developing compound. Phenols are exemplified as a developing agent. A matter which is blended with the color developing compound if heated and has no affinity to the developing agent is exemplified as a decoloring agent. The decolorable color material develops color through interaction between the color developing compound and the developing agent and is decolored as the interaction between the color developing compound and the developing agent is cut off by the heating at a temperature higher than or equal to a decoloring temperature. The MFP decolorizes the undecolored paper in a cassette in which a paper (normal paper) used for forming an image is set or a cassette the same as a manual feed cassette, or the undecolored paper and set in the manual feed cassette.

Figure 1:
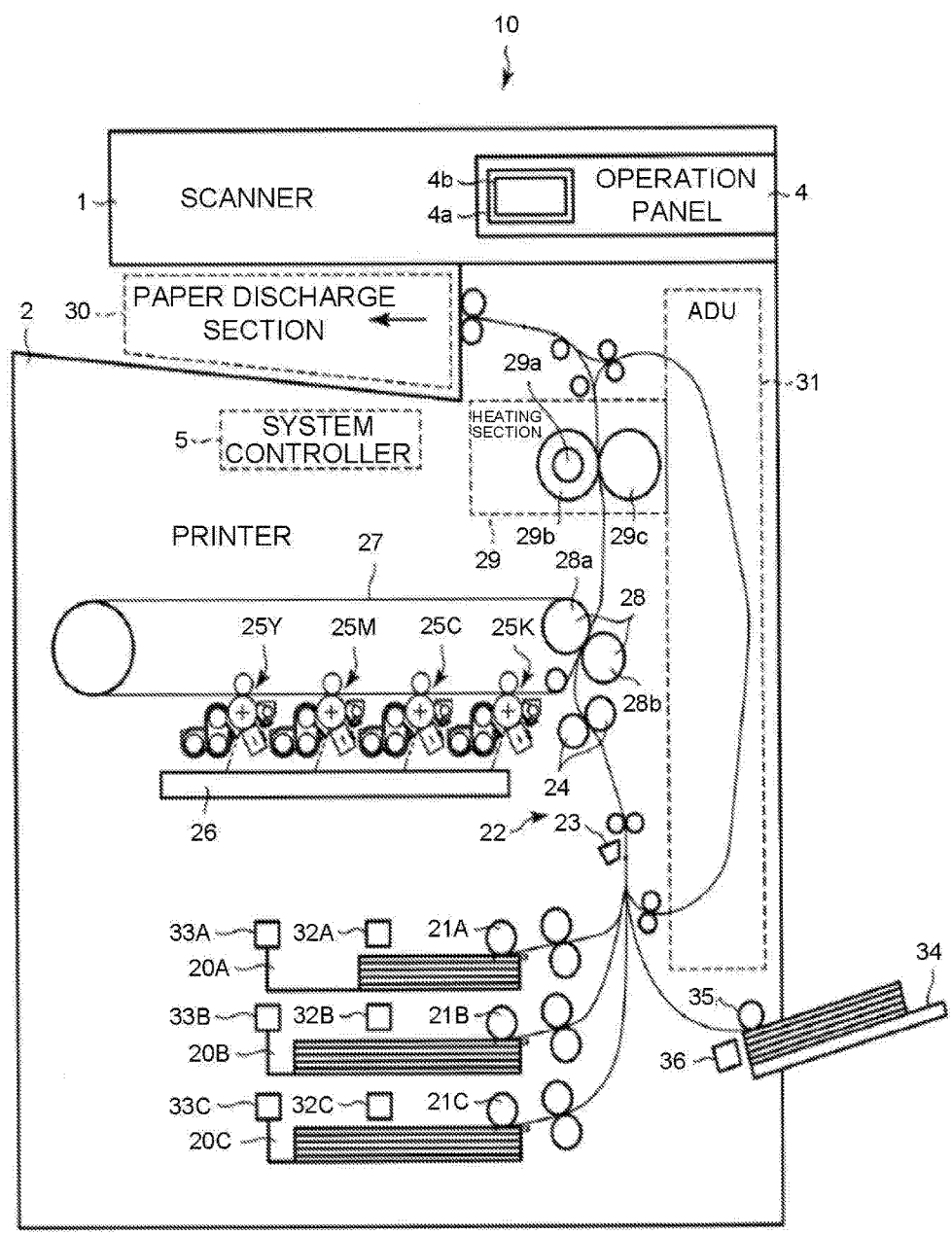
FIG. 1 is a sectional view illustrating a multi-function peripheral according to an embodiment.

FIG. 1 is a sectional view schematically illustrating the arrangement of an MTP 10 according to an embodiment. The MFP 10 according to the present embodiment functions as an image forming apparatus. As shown in FIG. 1, the MFP 10 comprises a scanner 1, a printer 2, an operation panel 4 and a system controller 5.

The scanner 1 is used to read an image of an original document to convert it to image data. The scanner 1 includes, for example, a CCD line sensor for converting an image on a reading surface of the original document into image data. The scanner 1 may either scan the original document placed on a document table glass or may read the image of the original document conveyed by an ADF (auto document feeder). The scanner 1 has a function (original document detection function) to detect a size of the original document. The scanner 1 is installed, for example, at the upper side of a main body of the MFP 10. The scanner 1 is controlled by the system controller 5. The scanner 1 outputs the image data of the original document to the system controller 5.

The printer 2 forms an image on the normal paper as an image forming medium. The printer 2 has a color printing function of printing a color image on the normal paper and a monochrome printing function of printing a monochrome image (for example, black) on the normal paper. For example, the printer 2 is an electrophotographic type image forming apparatus. The printer 2 forms a color image using toner of a plurality of colors (for example, three colors of yellow (Y), cyan (C) and magenta (M)). The printer 2 forms a monochrome image using monochrome (for example, black) toner.

The printer 2 has a decolorize function to decolorize the undecolored paper. The printer 2 decolorizes the undecolored paper by heating it to a predetermined temperature. The printer 2 sets a predetermined decoloring temperature to a heating section 29 described later and supplies the undecolored paper to the heating section 29 to decolorize the paper.

In the example of the arrangement shown in FIG. 1, the printer 2 includes paper feed cassettes 20 (20A, 20B and 20C) as the paper feed section. The paper feed cassette 20 is a paper feed section which supplies normal paper or undecolored paper. For example, each of the paper feed cassettes 20A, 20B and 20C is provided in a state of being openable and closable (or detachable) at the bottom of the main body of the MFP 10. The paper feed cassettes 20A, 20B and 20C store paper of a separately set type (for example, size or paper quality). The number of the paper feed cassettes as the paper feed section is not limited to 3. For example, the number of the paper feed cassettes may be one or two, or may be four or more.

The paper feed cassettes 20A, 20B and 20C include pickup rollers 21A, 21B and 21C, respectively. The pickup rollers 21A, 21B and 21C pick up papers one by one from the paper feed cassettes 20A, 20B and 20C. The pickup rollers 21A, 21B and 21C supply the papers picked up one by one to a conveyance section 22 composed of a plurality of conveyance rollers and the like.

The paper feed cassettes 20A, 20B and 20C include residual quantity sensors 32A, 32B and 32C. The residual quantity sensors 32A, 32B and 32C detect a quantity of papers stored in the paper feed cassettes 20A, 20B and 20C. For example, the residual quantity sensor 32 (32A, 32B or 32C) detects the height of the papers stacked on the paper feed cassette 20. For example, the residual quantity sensor 32 detects the height of a tray on which the papers are stacked within the paper feed cassette 20. The residual quantity sensor 32 may detect the height of the tray at a plurality of stages (0%, 25%, etc.). The residual quantity sensor 32 may detect the quantity of papers using a laser or the like, or may detect the quantity of papers by detecting the weight. The arrangement of the residual quantity sensor 32 is not limited to a specific configuration.

The paper feed cassettes 20A, 20B and 20C include opening and closing sensors 33A, 33B and 33C. The opening and closing sensors 33A, 33B and 33C detect whether the paper feed cassettes 20A, 20B and 20C are opened to the outside. In other words, the opening and closing sensor 33 (33A, 33B or 33C) detects whether the paper feed cassette 20 is pulled out and opened so that the paper can be taken out.

The printer 2 has a manual feed tray 34 as the paper feed section. The manual feed tray 34 supplies the normal paper or the undecolored paper. For example, the manual feed tray 34 is formed at the side of the MFP 10. The manual feed tray 34 has a structure capable of being opened and closed, and is a structure on which the paper can be set if the manual feed tray 34 is in an open state. The number of the manual feed trays as the paper feed section may be two or more.

The manual feed tray 34 has a pickup roller 21D. The pickup roller 21D picks up the papers one by one from the manual feed tray 34. The pickup roller 21D supplies the picked papers to the conveyance section 22.

The manual feed tray 34 has a paper sensor 36. The paper sensor 36 detects whether the papers are stacked on the manual feed tray 34. For example, the paper sensor 36 is formed as a protrusion formed on the manual feed tray 34. The paper sensor 36 detects that the papers are stacked on the manual feed tray 34 if the protrusion is pushed by the paper. The paper sensor 36 may detect stack of the papers using a laser or the like. The arrangement of the paper sensor 36 is not limited to a specific arrangement. The paper sensor 36 may detect the quantity of the papers stacked on the manual feed tray 34.

The conveyance section 22 conveys the paper in the printer 2. The conveyance section 22 conveys the paper supplied by the pickup rollers 21A, 21B and 21C to a resist roller 24. The conveyance section 22 conveys the paper supplied by the pickup roller 21D to the resist roller 24. The resist roller 24 conveys the paper to a transfer position at a timing of transferring an image from an intermediate transfer belt 27 to the paper.

A jam sensor 23 detects that the paper conveyed by the conveyance section 22 is jammed. For example, the jam sensor 23 detects that the jammed paper is contacted. A plurality of jam sensors 23 may be provided on a path of the conveyance section 22.

An image forming section 25 (25Y, 25M, 25C and 25K), an exposure section 26, the intermediate transfer belt 27 and a transfer section 28 function as image forming module for forming an image. The image forming section 25 (25Y, 25M, 25C or 25K) forms an image to be transferred onto the paper. In the example of the arrangement shown in FIG. 1, the image forming section 25Y forms an image with yellow toner. The image forming section 25M forms an image with magenta toner. The image forming section 25C forms an image with cyan toner. The image forming section 25K forms an image with black toner. Each image forming section 25 (25Y, 25M, 25C or 25K) overlaps an image of each color on the intermediate transfer belt 27 to transfer them. As a result, a color image is formed on the intermediate transfer belt 27.

The exposure section 26 forms an electrostatic latent image on a photoconductive drum (image carrier) of each image forming section 25 (25Y, 25M, 25C or 25K) by laser light. The exposure section 26 irradiates the photoconductive drum with laser light controlled according to the image data via an optical system such as a polygon mirror. The laser light from the exposure section 26 forms an electrostatic latent image on the surface of each photoconductive drum. The exposure section 26 controls the laser light in response to a control signal from the system controller 5. The electrostatic latent image formed on each photoconductive drum is an image developed with the toner of each color. For example, the exposure section 26 controls the power of the laser light in response to a control signal from the system controller 5. The exposure section 26 also controls a modulation amount of a pulse width for controlling the emission of the laser light according to a control signal from the system controller 5.

Each image forming section 25 (25Y, 25K, 25C or 25K) develops the electrostatic latent image formed on the photoconductive drum with toner of each color, respectively. Each image forming section 25 (25Y, 25K, 25C or 25K) forms a toner image as a visible image on the photoconductive drum. The intermediate transfer belt 27 is an intermediate transfer body. Each image forming section 25 (25Y, 25M, 25C or 25K) transfers the toner image formed on the photoconductive drum onto the intermediate transfer belt 27 (primary transfer). Each image forming section 25 (25Y, 25M, 25C or 25K) applies a transfer bias to the toner image at a primary transfer position. Each image forming section 25 (25Y, 25M, 25C or 25K) controls the transfer bias by a transfer current. The toner image on each photoconductive drum is transferred onto the intermediate transfer belt 27 by the transfer bias at each primary transfer position. The system controller 5 controls the transfer current that each image forming section uses for the primary transfer processing.

Each of the image forming sections 25Y, 25M, 25C and 25K has sensors such as a potential sensor and a density sensor. The potential sensor is a sensor that detects a surface potential of the photoconductive drum. In each of the image forming section 25Y, 25K, 25C and 25K, an electrostatic charger charges the surface of the photoconductive drum before being exposed by the exposure section 26. The system controller 5 can change a charging condition by the electrostatic charger. The potential sensor detects the surface potential in the photoconductive drum whose surface is charged by the electrostatic charger. The density sensor detects a density of the toner image transferred onto the intermediate transfer belt 27. The density sensor may detect the toner image formed on the photoconductive drum.

For example, in a case of forming a monochrome image, the image forming section 25K transfers a toner image (visible image) developed with black (monochrome) toner onto the intermediate transfer belt 27 (primary transfer). As a result, the intermediate transfer belt 27 holds the monochrome image formed by the black (monochrome) toner.

In a case of forming a color image, each of the image forming sections 25Y, 25M, 25C, and 25K overlaps the toner image (visible image) developed with the toners of each color (yellow, magenta, cyan and black) on the intermediate transfer belt 27 to transfer the toner image (primary transfer). As a result, the intermediate transfer belt 27 holds the color image formed by overlapping the toner images of those colors.

The transfer section 28 transfers the toner image on the intermediate transfer belt 27 onto the paper at a secondary transfer position. The secondary transfer position is a position at which the toner image on the intermediate transfer belt 27 is transferred onto the paper. The secondary transfer position is a position where a support roller 28a and a secondary transfer roller 28b face each other. The transfer section 28 applies a transfer bias controlled by the transfer current to the secondary transfer position. The transfer section 28 transfers the toner image (decoloring toner image or normal toner image) on the intermediate transfer belt 27 onto the paper by the transfer bias. The system controller 5 controls the transfer current used for the secondary transfer processing. For example, the system controller 5 may control the transfer current in a case of transferring the decoloring toner image and the transfer current in a case of transferring the normal toner image, respectively.

The heating section 29 has a function of fixing the toner on the paper. For example, in an embodiment, the heating section 29 fixes the toner image on the paper by applying heat to the paper. The heating section 29 has a function of decolorizing the decoloring toner. The heating section 29 decolorizes the decoloring toner by applying the heat to the decoloring toner.

The heating section 29 has an arrangement for heating the paper. In the example of the arrangement shown in FIG. 1, the heating section 29 includes a heat roller 29b including a heater 29a and a pressure roller 29c contacting a heating belt heated by the heat roller 29b in a pressurized state. The temperature of the heater 29a can be controlled. For example, the heater 29a may be a heater lamp such as a halogen lamp or an induction heating (IH) type heater. The heater 29a may be composed of a plurality of heaters.

For example, in a case of executing, a fixing processing for fixing the toner image on the normal paper, the system controller 5 controls the heating section 29 to a fixing temperature. The heating section 29 controlled at the fixing temperature pressurizes the normal paper onto which the toner image is transferred by the transfer section 28 while heating it at the fixing temperature. As a result, the heating section 29 fixes the toner image on the normal paper. The heating section 29 conveys the normal paper on which the fixing processing is executed to either the paper discharge section 30 or the ADU 31.

In a case of discharging the normal paper on which the fixing processing is executed by the heating section 29, the system controller 5 conveys the normal paper to the paper discharge section 30. In the case of forming an image also on a back surface of the paper subjected to the fixing processing by the heating section 29, the system controller 5 temporarily conveys the normal paper to the paper discharge section 30 side, and then switches back the normal paper to convey it to the ADU 31. In this case, the ADU 31 again supplies the paper inverted by switchback to the front of the resist roller 24.

In the case of executing the decoloring processing for decolorizing the undecolored paper, the system controller 5 controls the heating section 29 to a decoloring temperature (or a temperature at which the paper can be heated at the decoloring temperature) higher than the fixing temperature. The heating section 29 controlled to the decoloring temperature pressurizes the undecolored paper onto which the toner image is transferred by the transfer section 28 while heating it at the decoloring temperature. As a result, the heating section 29 makes the decoloring toner forming an image on the undecolored paper colorless to decolorize the undecolored paper.

In a case of discharging the paper on which the decoloring processing is executed by the heating section 29, the system controller 5 conveys the paper to the paper discharge section 30.

The operation panel 4 is a user interface, and the operation panel 4 has an operation section 4b and a display section 4a. Various operation instructions are input by a user to the operation section 4b. The operation section 4b outputs data of the operation instruction input by the user to the system controller 5. The operation section 4b is, for example, a keyboard, a numeric pad, a touch panel and the like. Herein, it is assumed that the operation section 4b is composed of a touch panel.

The display section 4a displays various information under the control of the system controller 5. The display section 4a is, for example, a liquid crystal monitor or screen. Herein, the display section 4a is integrally formed with the operation section 4b as a touch panel.

The operation panel 4 receives the input of an operation mode or setting information. For example, the operation panel 4 receives an operation of designating a specific paper feed cassette (paper feed section) as a black (monochrome) dedicated cassette from the user. Herein, the black (monochrome) dedicated cassette is used only for a monochrome (black) printing and prohibited from being used for a color printing.

The operation panel 4 may further include a physical button. The operation panel 4 outputs information input by the button to the system controller 5. The paper discharge section 30 stacks. The paper on which the image is formed or the decolored paper. In the example shown in FIG. 1, the paper discharge section 30 is formed between the printer 2 and the scanner 1. Incidentally, the paper discharge section 30 may be formed at any position.

Figure 2:
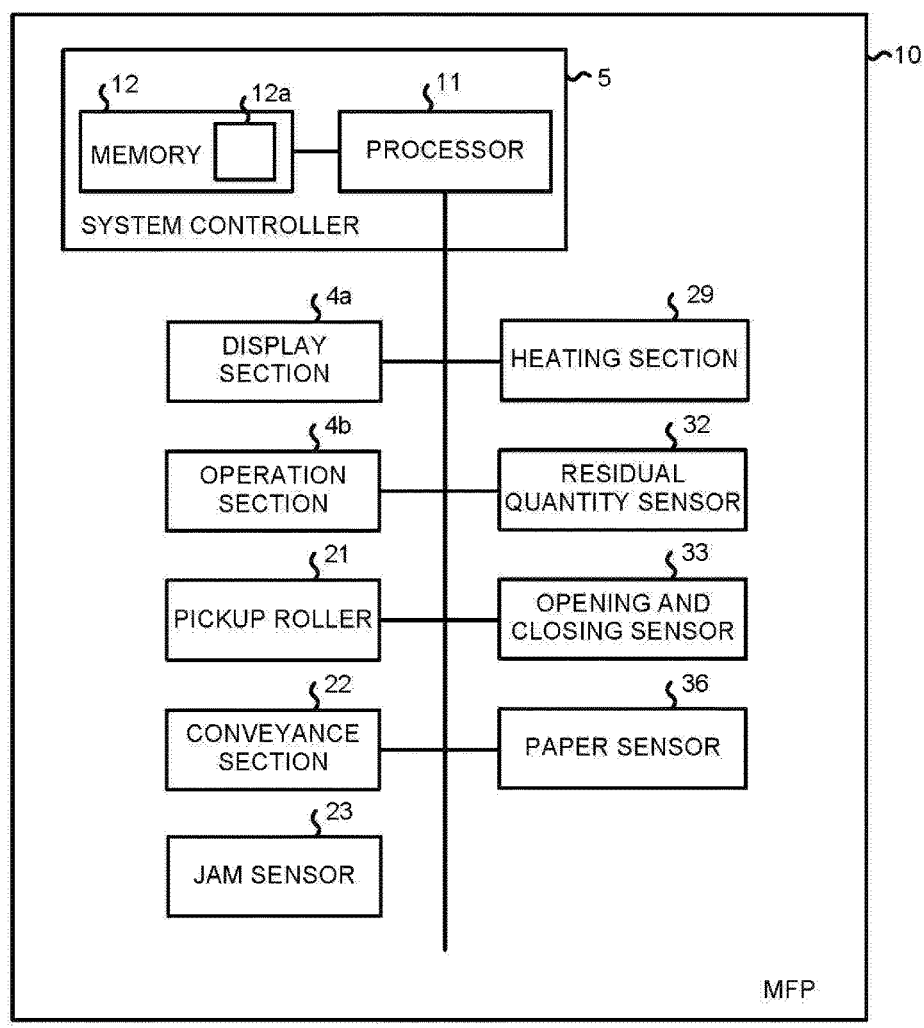
FIG. 2 is a block diagram exemplifying an arrangement of a multi-function peripheral according to an embodiment.

Next, an example of the arrangement of the control system of the MFP 10 is described. FIG. 2 shows an example of the arrangement of the control system of the MFP 10. As shown in FIG. 2, the MFP 10 includes the system controller 5, the display section 4a, the operation section 4b, the pickup roller 21 (21A to 21D), the conveyance section 22, the jam sensor 23, the heating section 29, the residual quantity sensor 32, the opening and closing sensor 33 and the paper sensor 36. The system controller 5 is composed of a processor 11 and a memory 12. The processor 11 and each section are mutually connected via a data bus line or the like.

The processor 11 (processing section) has a function of control ling the whole operation of the MFP 10. The processor 11 may include an internal cache and various interfaces. The processor 11 carries out various processing by executing a program stored in advance in the internal cache or the memory 12.

A part of the various functions realized by executing the program by the processor 11 may be realized by a hardware circuit. In this case, the processor 11 controls the functions executed by the hardware circuit.

The memory 12 stores various data. For example, the memory 12 functions as a ROM, a RAM, and a NVM.

For example, the memory 12 stores control programs, control data, and the like. The control programs and the control data are incorporated in advance according to the specification of the MFP 10. For example, the control program is a program or the like supporting the function realized by the MFP 10.

The memory 12 temporarily stores data being processed by the processor 11 and the like. The memory 12 may store data necessary for executing the application program, an execution result of the application program and the like.

The memory 12 has a storage area 12a (storage section) for storing undecolored paper flags indicating that the undecolored paper is stored for each paper feed cassette 20 and the manual feed tray 34 (paper feed section). The undecolored paper flag indicates that the undecolored paper is stored in the corresponding paper feed section. For example, if the undecolored paper flag is set (e.g., "1" is set), the undecolored paper flag indicates that the undecolored paper is stored in the corresponding paper feed section if the undecolored paper flag is collapsed (e.g., "0" is set), the undecolored paper flag indicates that the undecolored paper is not stored in the corresponding paper feed section. The storage area 12a stores the undecolored paper flag corresponding to each of the paper feed cassettes 20A, 20B and 20C and the manual feed tray 34.

The display section 4a, the operation section 4b, the pickup roller 21, the conveyance section 22, the jam sensor 23, the heating section 29, the residual quantity sensor 32, the opening and closing sensor 33 and the paper sensor 36 are as described above.

Next, the functions realized by the processor 11 are described.

First, the processor 11 has a function of decoloring the undecolored paper set in the paper feed section.

For example, the user sets the undecolored paper in the paper feed section (the paper feed cassettes 20A, 20B or 20C or the manual feed tray 34). The processor 11 receives an operation of executing the decoloring processing from the user through the operation section 4b. The processor 11 receives the selection of the paper feed section in which the undecolored paper is set from the user through the operation section 4b. For example, the processor 11 displays an icon indicating each paper feed section and receives a tap on the icon as a selection operation.

The processor 11 sets the decoloring temperature in the heating section 29. The heating section 29 heats the heater 29a to the decoloring temperature.

The processor 11 picks up the undecolored paper from the selected paper feed section. For example, the processor 11 operates the pickup roller (pickup roller 21A, 21B, 21C or 35) corresponding to the paper feed section and picks up the undecolored paper. The processor 11 conveys the picked undecolored paper to the heating sect on 29 using the conveyance section 22.

As mentioned above, the heating section 29 is set to the decoloring temperature. Therefore, the processor 11 heats the undecolored paper at the decoloring temperature by supplying the undecolored paper to the heating section 29. The toner on the undecolored paper is decolorized by being heated at the decoloring temperature.

The processor 11 uses the conveyance section 22 to discharge the decolorized paper to the paper discharge section 30.

The processor 11 repeats the above operation until there is no undecolored paper in the selected paper feed section.

In a case of stopping the decoloring processing, the processor has a function of setting the undecolored paper flag corresponding to the paper feed section where the undecolored paper is set.

The processor 11 interrupts the decoloring processing in specified cases. For example, in a case of receiving an operation to interrupt the decoloring processing through the operation section 4b, the processor 11 interrupts the decoloring processing. In a case of detecting a jam of the undecolored paper through the jam sensor 23, the processor 11 interrupts the decoloring processing.

If the decoloring processing is interrupted, the processor 11 determines whether the interrupted decoloring processing is stopped. For example, if the processor 11 receives an operation (for example, an operation of returning to a normal screen) of stopping the interrupted decoloring processing, the processor 11 stops the interrupted decoloring processing. The processor 11 sets a value (for example, "1") indicating that the undecolored paper is stored in the undecolored paper flag corresponding to the paper feed section where the undecolored paper subjected to the stopped decoloring processing is set.

If the undecolored paper flag is set, the processor 11 has a function of displaying a warning for urging to take out the undecolored paper from the paper feed section.

For example, the processor 11 displays a warning (warning screen) on the display section 4a to urge to take out the undecolored paper from the paper feed section where the undecolored paper is set.

For example, the processor 11 displays a message for urging to take out the undecolored paper from the paper feed section where the undecolored paper is set on the display section 4a. The processor 11 may issue a warning sound or may turn on a warning lamp.

Figure 3:
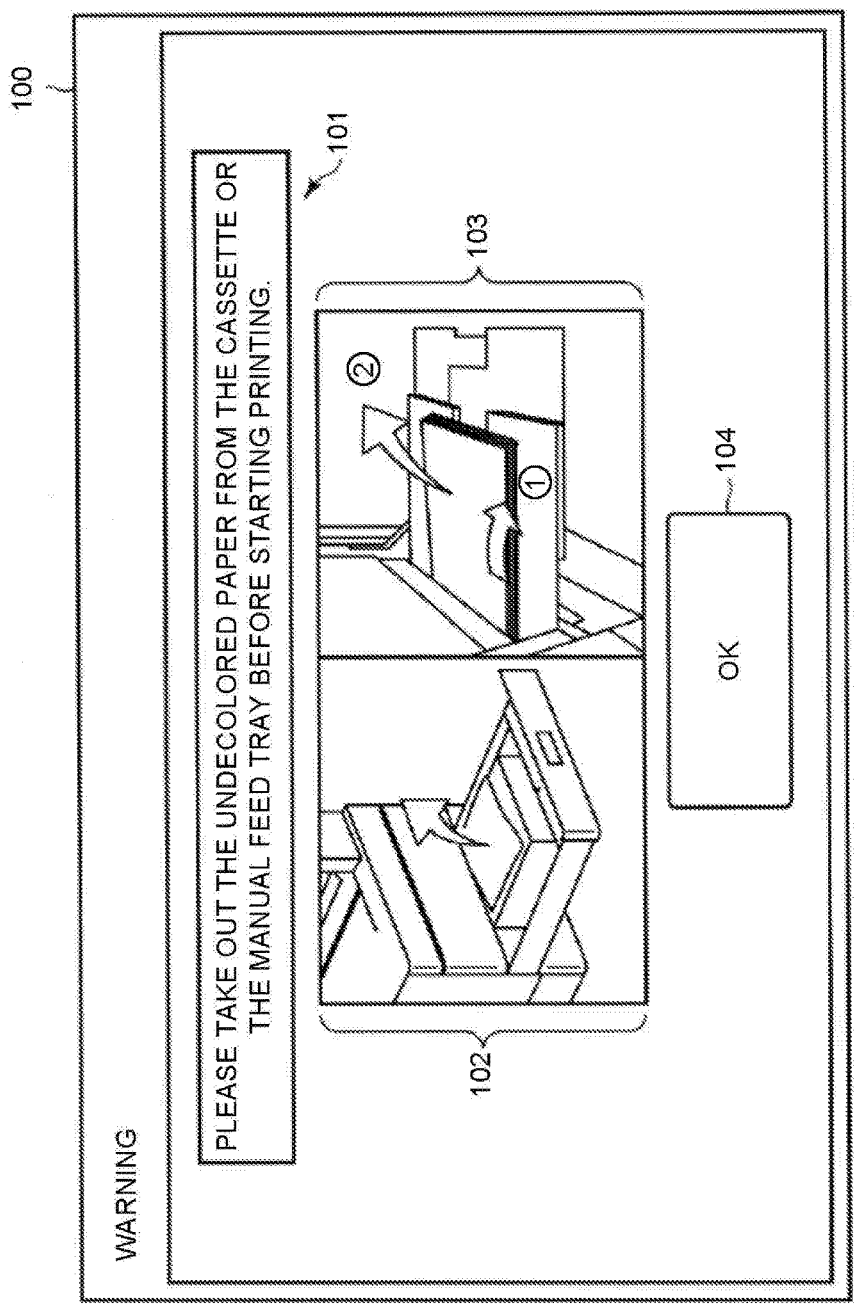
FIG. 3 is a diagram exemplifying an arrangement of a warning screen according to an embodiment.

FIG. 3 is a diagram illustrating an example of the arrangement of a warning screen 100. As shown in FIG. 3, the warning screen 100 includes a message 101, a guide map 102, a guide map 103, and an OK icon 104. In addition to the arrangement shown in FIG. 3, the warning screen 100 may have a component as necessary or exclude a specific component.

The message 101 is a content for urging to take out the undecolored paper from the paper feed section. In the example shown in FIG. 3, the message 101 is "Please take out the undecolored paper from the cassette or the manual feed tray before starting printing."

The guide map 102 is used for taking out the undecolored paper from the paper feed cassette 20. As shown in FIG. 3, the guide map 102 urges to pull out the paper feed cassette 20 to take out the undecolored paper.

The guide map 103 is used for taking out the undecolored paper from the manual feed tray 34. As shown in FIG. 3, the guide map 103 urges to pull out the manual feed tray 34 to take out the undecolored paper from the manual feed tray 34.

The OK icon 104 is an icon for closing the warning screen 100. If detecting a tap on the OK icon 104, the processor 11 closes the warning screen 100.

If receiving an operation to restart the interrupted decoloring processing without stopping it, the processor 11 restarts the decoloring processing without displaying the warning screen 100. If the decoloring processing of all the undecolored papers stored in the paper feed section is completed without stopping, the processor 11 terminates the operation without displaying the warning screen 100. For example, the processor 11 returns to the screen (normal screen) for receiving a print instruction.

The processor 11 has a function (automatic clear function) for resetting the setting (updating various setting values to initial values) after a predetermined time elapses since the completion of the predetermined operation.

For example, the processor 11 starts a timer if a predetermined operation (e.g., the decoloring processing or the printing processing) is completed. The processor 11 resets the setting if the timer reaches a predetermined value.

For example, the processor 11 resets the setting, such as selection of printing number of sheets, aggregation, duplex printing or the paper feed section to default states. The processor 11 resets the selection of the paper feed section to which the decoloring processing is executed or the setting such as the undecolored paper flag.

The processor 11 switches to enable or disable the automatic clear function according to the operation inputted by the user via the operation section 4b.

The processor 11 does not operate (disable) the automatic clear function if at least one of the undecolored paper flags stored in the storage area 12a is set. For example, the processor 11 does not start the timer of the automatic clear function if at least one of the undecolored paper flags is set in a case in which the automatic clear function is enabled. The processor 11 stops the started timer.

The processor 11 has the function of displaying a warning in the paper feed section where the undecolored paper flag is set if receiving selection of the paper feed section of the paper used for printing.

For example, the processor 11 displays a list of the paper feed sections used for printing on the normal screen or the like and receives the selection. The processor 11 displays the selection of the paper feed section with the undecolored paper flag set with a warning indicating that the undecolored paper is stored. For example, the processor 11 displays a message or a mark indicating that it is unusable.

The processor 11 has a function of displaying a warning for urging to take out the undecolored paper from the paper feed section if receiving the selection of the paper feed section with the undecolored paper flag set as the paper feed section of the paper used for printing.

For example, the processor 11 receives an operation of selecting the paper feed section of the paper used for printing through the operation section 4b. If receiving the operation of selection, the processor 11 acquires the state of the undecolored paper flag corresponding to the selected paper feed section from the storage area 12a.

If acquiring the state of the undecolored paper flag, the processor 11 determines whether the undecolored paper flag is set. If it is determined that the undecolored paper flag is set, the processor 11 displays a warning (warning screen) for urging to take out the undecolored paper from the paper feed section.

The processor 11 has the function of resetting (collapsing) the undecolored paper flag corresponding to the paper feed section if the undecolored paper is taken out from the paper feed section.

For example, while displaying the warning screen 100, the processor 11 resets the undecolored paper flag corresponding to the paper feed section if detecting that the undecolored paper is taken out from the paper feed section. In other words, the processor 11 sets a value (for example, "0") indicating that the undecolored paper is not stored in the undecolored paper flag. The processor 11 may reset the undecolored paper flag even if detecting that the undecolored paper is taken out from the paper feed section at another timing.

For example, in a case in which the paper feed section is the paper feed cassette 20, if detecting that the paper feed cassette 20 is open so that the paper can be taken out through the opening and closing sensor 33, the processor 11 determines that the undecolored paper is taken out from the paper feed cassette 20. If detecting that the quantity of the papers in the paper feed cassette 20 becomes 0 through the residual quantity sensor 32, the processor 11 may determine that the undecolored paper is taken out from the paper feed cassette 20.

In a case in which the paper feed section is the manual feed tray 34, if detecting that there is no paper the manual feed tray 34 through the paper sensor 36, the processor 11 determines that the undecolored paper is taken out from the manual feed tray 34.

The processor 11 may determine whether an image is formed on the paper stored in the paper feed section by toner using an image processing. For example, the processor 11 may determine that the undecolored paper is taken out if no image is formed on the paper. The method of determining whether the processor 11 takes out the undecolored paper from the paper feed section is not limited to a specific method.

Figure 4:
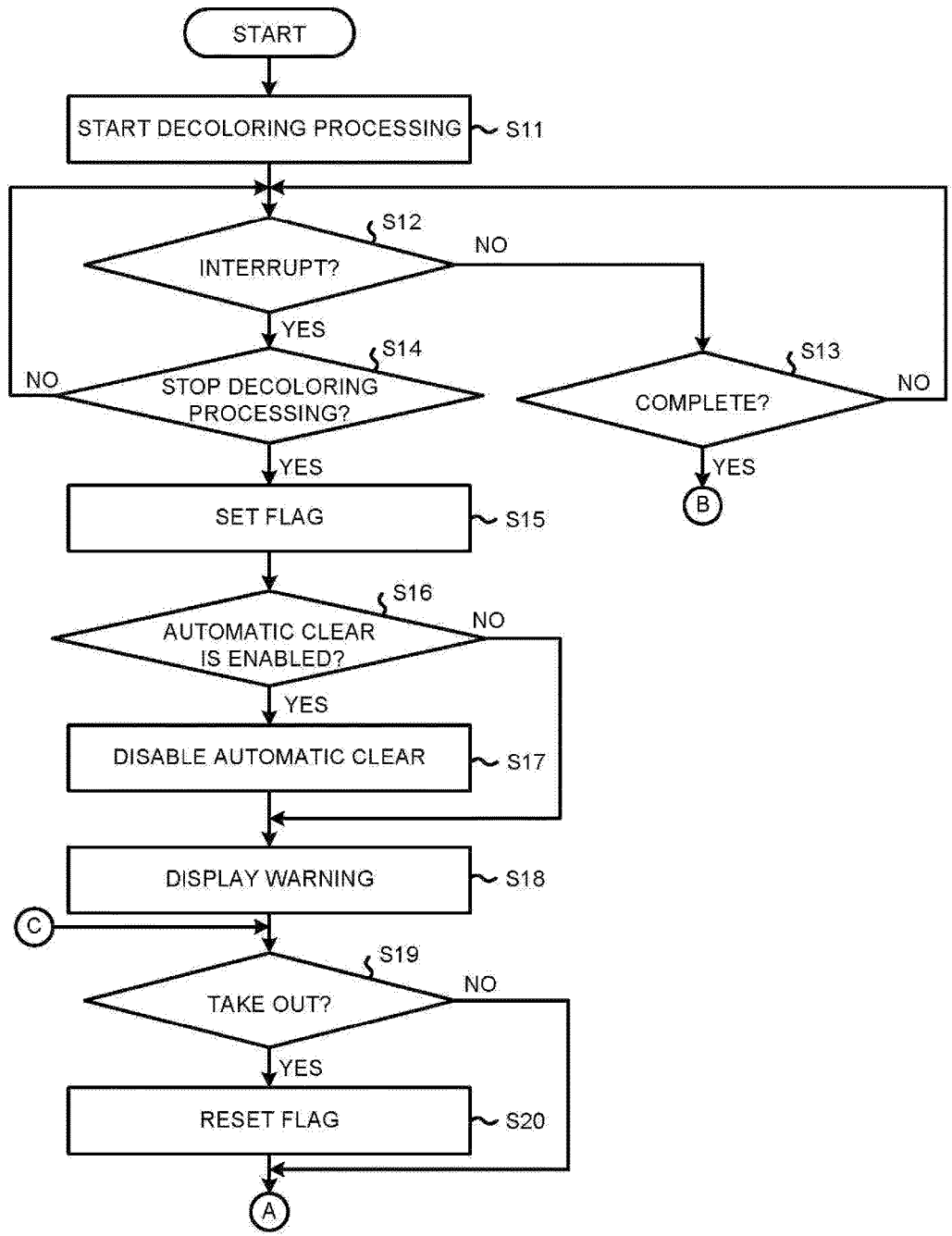
FIG. 4 is a flowchart exemplifying an operation of a multi-function peripheral according to an embodiment.
Figure 5:
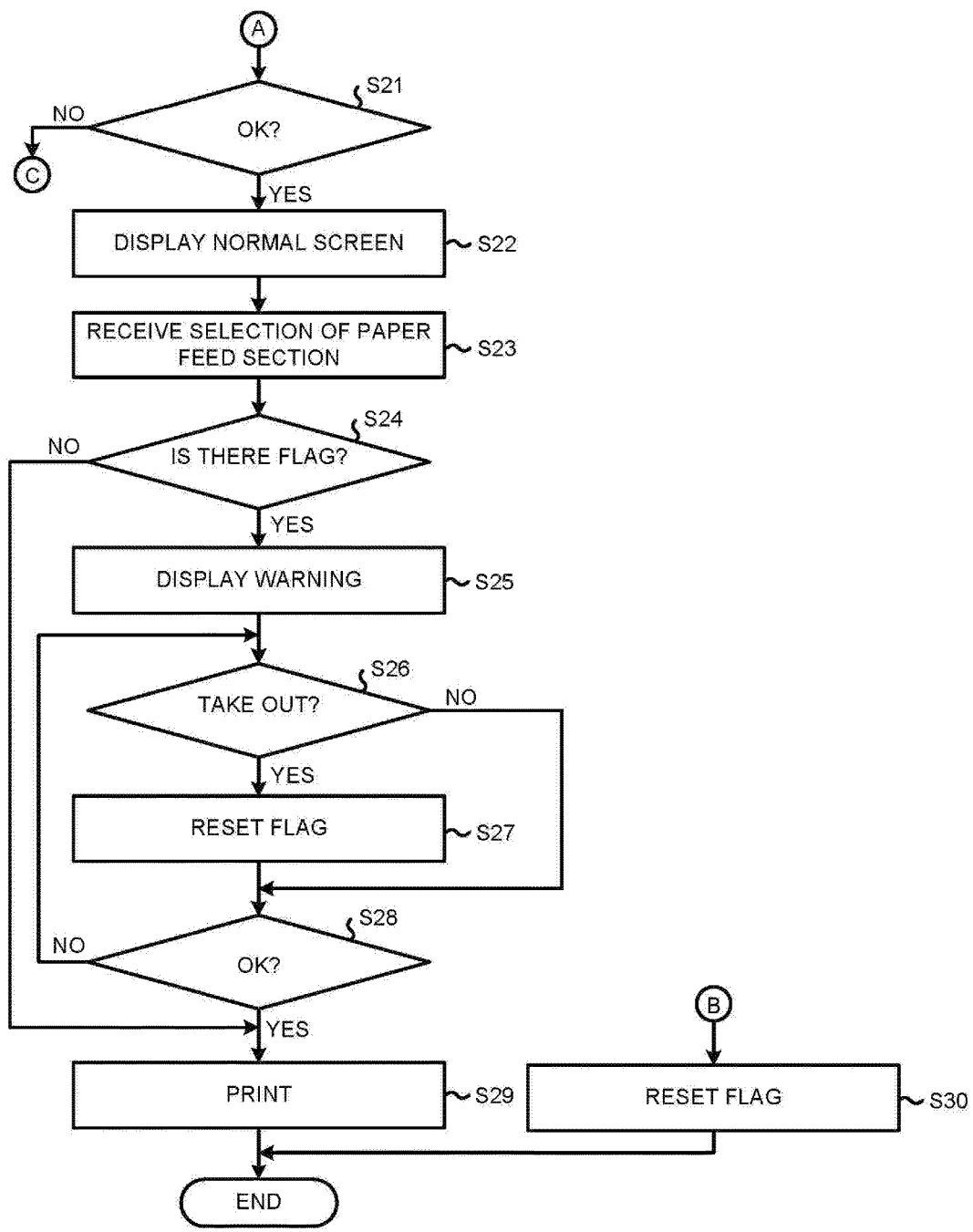
FIG. 5 is a flowchart exemplifying as operation of a multi-function peripheral according to an embodiment.

Next, an operation example of the MFP 10 is described. FIG. 4 and FIG. 5 are flowcharts exemplifying the operation of the MFP 10. Here, the user sets the undecolored paper in the designated paper feed section, and inputs the operation to execute the decoloring processing through the operation section 4b.

The processor 11 of the MFP 10 starts the decoloring processing of the undecolored paper set in the designated paper feed section (ACT S11). If the decoloring processing is started, the processor 11 determines whether the decoloring processing is interrupted (ACT S12). If it is determined that the decoloring processing is not interrupted (No in ACT S12), the processor 11 determines whether or not the decoloring processing is completed for all the papers set in the paper feed section (ACT S13).

If it is determined that the decoloring processing for all the papers set in the paper feed section is not completed (No in ACT S13), the processor 11 returns to the processing in ACT S12. If it is determined that the decoloring processing is interrupted (Yes in ACT S12), the processor 11 determines whether the interrupted decoloring processing is stopped (ACT S14). If it is determined that the interrupted decoloring processing is not stopped (restarted) (No in ACT S14), the processor 11 returns to the processing in ACT S12.

If it is determined that the interrupted decoloring processing is stopped (Yes in ACT S14), the processor 11 sets the undecolored paper flag corresponding to the paper feed section (ACT S15).

If the undecolored paper flag is set, the processor 11 determines whether the automatic clear function is enabled (ACT S16). If it is determined that the automatic clear function is enabled (Yes in ACT S16), the processor 11 disables the automatic clear function (ACT S17).

If it is determined that the automatic clear function is not enabled (No in ACT S16) or if the automatic clear function is disabled (ACT S17), the processor 11 displays the warning screen 100 in the display section 4a (ACT S18). If displaying the warning screen 100, the processor 11 determines whether the undecolored paper is taken out from the paper feed section (ACT S19).

If it is determined that the undecolored paper is taken out from the paper feed section (Yes in ACT S19), the processor 11 resets the undecolored paper flag corresponding to the paper feed section (ACT S20).

If it is determined that the undecolored paper is not taken out from the paper feed section (No in ACT S19), or if the undecolored paper flag corresponding to the paper feed section is reset (ACT S20), the processor 11 determines whether the tap on the OK icon 104 is detected (ACT S21).

If it is determined that the tap on the OK icon 104 is not detected (NO in ACT S21), the processor 11 returns to the processing in ACT S19. If it is determined that the tap on the OK icon 104 is detected (Yes in ACT S21), the processor 11 displays the normal screen on the display section 4*a* (ACT S22). Here, the user inputs the selection of the paper feed section to supply the paper to print the image on the paper.

If displaying the normal screen, the processor 11 receives the selection of the paper feed section for supplying the paper through the operation section 4*b* (ACT S23). If receiving the selection of the paper feed section for supplying the paper, the processor 11 determines whether the undecolored paper flag of the selected paper feed section is set (ACT S24).

If it is determined that the undecolored paper flag is set (Yes in ACT S24), the processor 11 displays the warning screen 100 on the display section 4*a* (ACT S25).

If the warning screen 100 is displayed, the processor 11 determines whether the undecolored paper is taken out from the paper feed section (ACT S26).

If it is determined that the undecolored paper is taken out from the paper feed section (Yes in ACT S26), the processor 11 resets the undecolored paper flag corresponding to the paper feed section (ACT S27).

If it is determined that the undecolored paper is not taken out from the paper feed section (No in ACT S26), or if the undecolored paper flag corresponding to the paper feed section is reset (ACT S27), the processor 11 determines whether the tap on the OK icon 104 is detected (ACT S28).

If it is determined that the tap on the OK icon 104 is not detected (NO in ACT S28), the processor 11 returns to the processing in ACT S26.

If it is determined that the tap on the OK icon 104 is detected (Yes in ACT S28), or if it is determined that the undecolored paper flag is in the reset state (No in ACT S24), the processor 11 takes out the paper from the paper feed section and prints an image (ACT S29).

If the image is printed (ACT S29) or if it is determined that the decoloring processing is completed for all the papers set in the paper feed section (Yes in ACT S13), the processor 11 ends the operation.

The processor 11 may execute the processing in ACT S14 if NO is taken in ACT S17. In that case, the processor 11 may not execute the processing in S30.

The MFP 10 may not execute the color printing. The MFP 10 may execute the monochrome printing. The MFP 10 may execute a printing using the decoloring toner or the normal toner.

The processor 11 may display the warning screen in response to the paper feed section with the undecolored paper flag set. For example, if the undecolored paper flag of the paper feed cassette 20 is set, the processor 11 displays the guide map 102 on the warning screen. The processor 11 may display different guide maps for each paper feed cassette 20. If the undecolored paper flag of the manual feed tray 34 is set, the processor 11 displays the guide map 103 on the warning screen.

The processor 11 may not receive the operation of selecting the paper feed section with the undecolored paper flag set as the paper feed section which supplies the paper used for printing. For example, the processor 11 hides or grays out the paper feed section with the undecolored paper flag set in ACT S22.

The processor 11 may not start the printing if the paper feed section with the undecolored paper flag set is selected as the paper feed section which supplies the paper used for printing. For example, the processor 11 does not start the printing even if Yes is taken in ACT S28 in the above case. In this case, the processor 11 may display an error indicating that the printing is impossible.

The processor 11 may supply the paper from another paper feed section whose undecolored paper flag is collapsed in a case in which the paper feed section with the undecolored paper flag set is selected as the paper feed section which supplies the paper used for printing. For example, the processor 11 supplies the paper from another paper feed section if Yes is taken in ACT S28 in this case.

The processor 11 may set the undecolored paper flag corresponding to the paper feed section if the undecolored paper remains in the paper feed section. For example, if the decoloring processing for the paper feed section is stopped, the processor 11 determines whether the paper remains in the paper feed section using the residual quantity sensor 32 or the paper sensor 36 of the paper feed section. If it is determined that the paper remains, the processor 11 sets the undecolored paper flag corresponding to the paper feed section.

In the description of the above embodiment, "the decoloring processing" is described as erasing the color of the image, but it may include a meaning of erasing the image. In other words, the image forming apparatus according to the present embodiment is not limited to an apparatus that erases the color of the image by heat. For example, it may be an apparatus that erases the color of an image on a sheet by light irradiation, or an apparatus that erases an image formed on a special sheet. Alternatively, the image forming apparatus may be an apparatus for removing (erasing) an image on a sheet. The image forming apparatus may have any arrangement as long as the image on the sheet cannot be seen so that the sheet can be reused.

The multi-function peripheral described above sets the undecolored paper flag if the decoloring processing of the undecolored paper is stopped and the undecolored paper remains in the paper feed section. The multi-function peripheral displays the warning for urging to take out the undecolored paper from the paper feed section if the undecolored paper flag is set. As a result, the multi-function peripheral can prevent images from being printed on the undecolored paper remaining in the paper feed section.

The multi-function peripheral disables the automatic clear function if the undecolored paper flag is set. As a result, the multi-function peripheral can prevent the undecolored paper flag from being reset by the automatic clear function.

The multi-function peripheral does not display the warning for urging to take out the undecolored paper from the paper feed section if the decoloring processing is completed. As a result, the multi-function peripheral can return to the normal screen without requiring the operation of the user.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a paper feeder configured to store a plurality of papers; and
an operation panel configured to receive an input from a user for an operation to execute a decoloring processing or to stop execution of the decoloring processing;
a processor configured to
execute the decoloring processing for decolorizing a plurality of undecolored papers stored in the paper feeder until there is no undecolored paper in the paper feeder, in response to receiving, via the operation panel, the input from the user for the operation to stop executing the decoloring processing,
issue a warning indicating that the paper stored in the paper feeder is taken out when the decoloring processing is stopped, and
issue no warning when there is no undecolored paper in the paper feeder.

2. The image forming apparatus according to claim 1, wherein
the processor receives an operation of selecting a paper feeder which supplies paper on which an image is printed, and issues the warning when the decoloring processing for decolorizing the undecolored paper stored in the selected paper feeder is stopped.

3. The image forming apparatus according to claim 1, wherein
the processor executes an automatic clear function for updating a setting value to an initial value after a predetermined time elapse since completion of a predetermined operation, and does not execute the automatic clear function when the decoloring processing for decolorizing the undecolored paper stored in the paper feeder is stopped.

4. The image forming apparatus according to claim 2, wherein
the processor executes an automatic clear function for updating a setting value to an initial value after a predetermined time elapse since completion of a predetermined operation, and does not execute the automatic clear function when the decoloring processing for decolorizing the undecolored paper stored in the selected paper feeder is stopped.

5. The image forming apparatus according to claim 1, wherein
the processor does not issue the warning when detecting that the undecolored paper is taken out from the paper feeder.

6. The image forming apparatus according to claim 5, wherein the processor detects that the undecolored paper is taken out when the paper feeder is open so that the paper can be taken out.

7. A method for preventing printing on undecolored paper, including:
receiving an input from a user, via an operation panel, of an operation to execute a decoloring processing or to stop execution of the decoloring processing;
executing the decoloring processing for decolorizing undecolored paper stored in a paper feeder, the decoloring processing comprising decolorizing a plurality of undecolored papers until there is no decolored paper in the paper feeder, upon receiving the operation to stop executing the decoloring processing from the user via the operation panel; and
issuing a warning indicating that the paper stored in the paper feeder is taken out when the decoloring processing is stopped, and not issuing the warning when the decoloring processing is completed and there is no undecolored paper in the paper feeder.

8. The method of claim 7, further comprising:
interrupting the decoloring process in response to an inputted operation.

9. The method of claim 7, further comprising:
executing an automatic clear function to update a setting value to an initial value after a predetermined time elapses since completion of a predetermined operation, and refraining from executing the automatic clear function when the decoloring processing for decolorizing undecolored paper is stopped.

10. The method according to claim 7, further comprising:
detecting when undecolored paper is removed from the paper feeder.

11. The method according to claim 10, further comprising:
detecting that the undecolored paper is removed when the paper feeder is open.

12. An image forming apparatus, comprising:
a paper feeder configured to store a plurality of papers; and
a processor configured to
execute a decoloring processing for decolorizing a plurality of undecolored papers stored in the paper feeder,
issue a warning indicating that the paper stored in the paper feeder is taken out when the decoloring processing is stopped;
issue no warning when there is no undecolored paper in the paper feeder, and
execute an automatic clear function for updating a setting value to an initial value after a predetermined time elapse since completion of a predetermined operation, and not execute the automatic clear function when the decoloring processing for decolorizing the undecolored paper stored in the paper feeder is stopped.

* * * * *